United States Patent
Keesara (10) Patent No.: US 9,077,550 B2
(45) Date of Patent: Jul. 7, 2015

(54) METHOD AND APPARATUS FOR PERFORMING MULTICAST BACKBONE MEDIA ACCESS CHANNEL (BMAC) HEADER TRANSFORMATIONS

(71) Applicant: Avaya, Inc., Basking Ridge, NJ (US)

(72) Inventor: Srikanth Keesara, Tewksbury, MA (US)

(73) Assignee: AVAYA, INC., Basking Ridge, NJ (US)

( * ) Notice: Subject to any disclaimer, the term of this patent is extended or adjusted under 35 U.S.C. 154(b) by 164 days.

(21) Appl. No.: 13/627,043

(22) Filed: Sep. 26, 2012

(65) Prior Publication Data

US 2014/0086244 A1  Mar. 27, 2014

(51) Int. Cl.
*H04J 3/16* (2006.01)
*H04J 3/22* (2006.01)
*H04L 12/18* (2006.01)
*H04L 12/46* (2006.01)

(52) U.S. Cl.
CPC .......... *H04L 12/1836* (2013.01); *H04L 12/465* (2013.01); *H04L 12/4666* (2013.01)

(58) Field of Classification Search
CPC ................................................. H04L 29/06068
USPC .................................. 370/466, 390, 392, 467
See application file for complete search history.

(56) References Cited

U.S. PATENT DOCUMENTS

| | | | | |
|---|---|---|---|---|
| 7,808,997 | B2* | 10/2010 | Long | 370/392 |
| 7,929,554 | B2* | 4/2011 | Sajassi et al. | 370/401 |
| 2007/0053374 | A1* | 3/2007 | Levi | 370/431 |
| 2009/0144403 | A1* | 6/2009 | Sajassi et al. | 709/223 |
| 2010/0158017 | A1* | 6/2010 | Casey | 370/395.53 |
| 2010/0158024 | A1* | 6/2010 | Sajassi et al. | 370/401 |
| 2010/0260098 | A1* | 10/2010 | Ulupinar et al. | 370/315 |
| 2011/0255540 | A1* | 10/2011 | Mizrahi et al. | 370/392 |
| 2013/0195111 | A1* | 8/2013 | Allan et al. | 370/395.53 |

* cited by examiner

*Primary Examiner* — Chuong T Ho
(74) *Attorney, Agent, or Firm* — Anderson Gorecki & Rouille LLP (57) ABSTRACT

A method, apparatus and computer program product for performing multicast Backbone Media Access Channel (BMAC) header transformations is presented. A packet having a header is received at a network node. The header is modified to produce a packet having a modified header by replacing an original value inside the header with a less granular value. The packet having a modified header is forwarded into a transport network.

17 Claims, 9 Drawing Sheets

METHOD AND APPARATUS FOR PERFORMING MULTICAST BACKBONE MEDIA ACCESS CHANNEL (BMAC) HEADER TRANSFORMATIONS

BACKGROUND

Computer networks have become ubiquitous. One type of network technology is known as Shortest Path Bridging (SPB). SPB in computer networking is a technology that greatly simplifies the creation and configuration of carrier, enterprise, and cloud networks which virtually eliminates human error, while enabling multipath routing. SPB allows all paths to be active with multiple equal cost paths, provides much larger layer 2 topologies, faster convergence times, and improves the use of the mesh topologies through increase bandwidth and redundancy between all devices by allowing traffic to load share across all paths of a mesh network.

In an SPB network packets are encapsulated at the edge in Media Access Control (MAC)-in-MAC and transported only to other members of the logical network. Unicast and multicast are supported and all routing is on symmetric shortest paths. Many equal cost shortest paths are supported. As SPB networks become more widely deployed, it is anticipated that network operators would try to connect multiple independently operated SPB networks to one another in a peering model.

One reason for connecting multiple independently operated SPB networks to one another is to provide transport services that interconnect multiple segments of a private SPB network. Another reason is to break up a large SPB network into multiple smaller SPB networks for reasons of scale, ease of administration, and the like.

In such scenarios a mechanism is needed that allows the number of node, services and the resulting multicast forwarding state in each SPB network to grow independent of the limitations of the other SPB networks that it might be connected to. Left unaddressed this can cause an unmanageable explosion in the multicast forwarding table size.

SUMMARY

Conventional mechanisms such as those explained above suffer from a variety of deficiencies. One such deficiency is that the conventional solutions target either a single flat SPB network or they use a transport network along with additional transport encapsulation when connecting multiple SPB networks together. The use of a single flat network exposes all nodes in the network to increased forwarding information base (FIB) sizes as services get added and additional encapsulation implies added extra overhead to the packet sizes.

Embodiments of the invention significantly overcome such deficiencies and provide mechanisms and techniques that provide multicast Backbone Media Access Control (BMAC) header translations. The use of the presently described mechanisms and techniques results in less forwarding state in the transport network.

In a particular embodiment of a method for providing multicast BMAC header translations, the method includes receiving, at a network node, a packet having a header. The method further includes modifying the header to produce a packet having a modified header by replacing an original value inside the header with a less granular value. The method also includes forwarding the packet having a modified header.

Other embodiments include a computer readable medium having computer readable code thereon for providing multicast BMAC header translations. The computer readable medium includes instructions for receiving, at a network node, a packet having a header. The computer readable medium further includes instructions for modifying the header to produce a packet having a modified header by replacing an original value inside the header with a less granular value. The computer readable medium also includes instructions for forwarding the packet having a modified header.

Still other embodiments include a computerized device (e.g. a network node), configured to process all the method operations disclosed herein as embodiments of the invention. In such embodiments, the computerized device includes a memory system, a processor, communications interface in an interconnection mechanism connecting these components. The memory system is encoded with a process that provides multicast BMAC header translations as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing multicast BMAC header translations as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

The preferred embodiment of the invention will now be described with reference to the accompanying drawings. The invention may, however, be embodied in many different forms and should not be construed as limited to the embodiment set forth herein; rather, this embodiment is provided so that this disclosure will be thorough and complete, and will fully convey the scope of the invention to those skilled in the art. The terminology used in the detailed description of the particular embodiment illustrated in the accompanying drawings is not intended to be limiting of the invention. In the drawings, like numbers refer to like elements.

Figure 1:
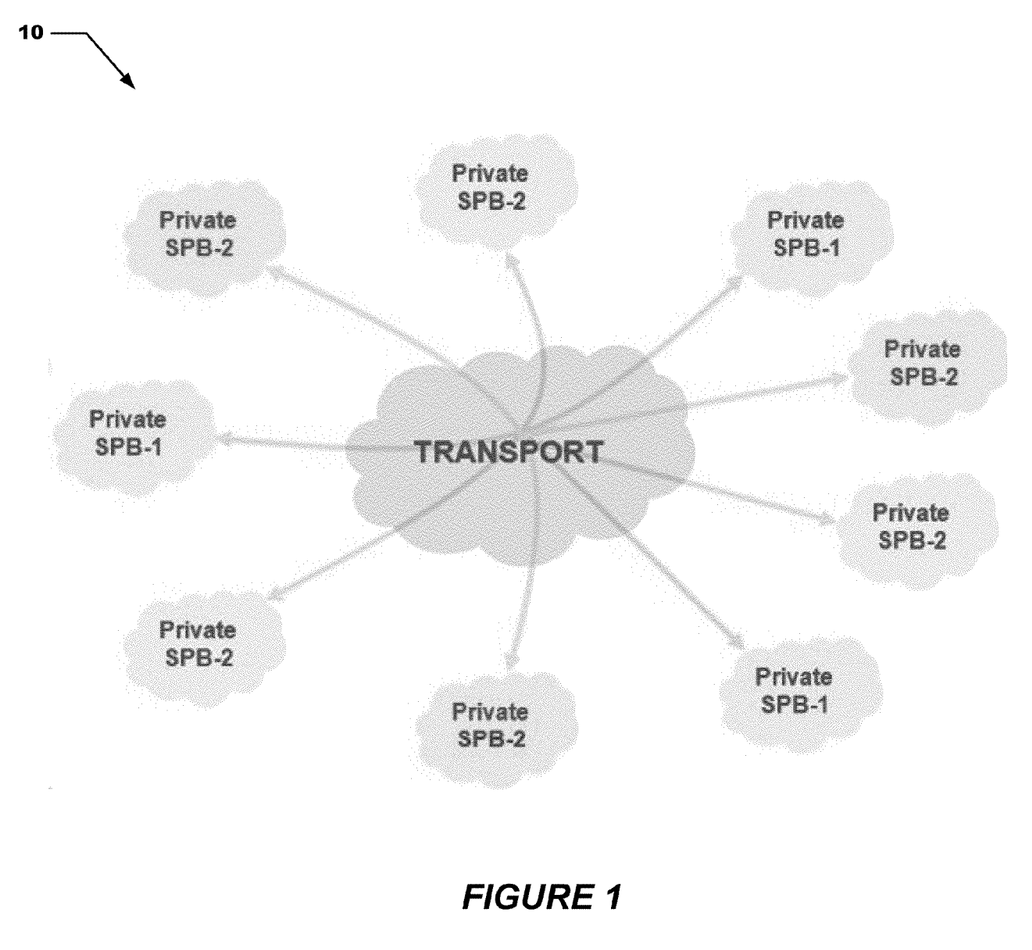
FIG. 1 depicts a network environment including a plurality of private SPB networks using an SPB transport.

Referring to FIG. 1, an environment 10 is shown including a transport network and a plurality of private SBP networks. The transport network is used to connect multiple independently operated SPB networks to one another in a peering model. SPB technology is a protocol for building efficient transport networks. SPB networks can transport data packets without needing to examine customer information at every node.

Figure 2:
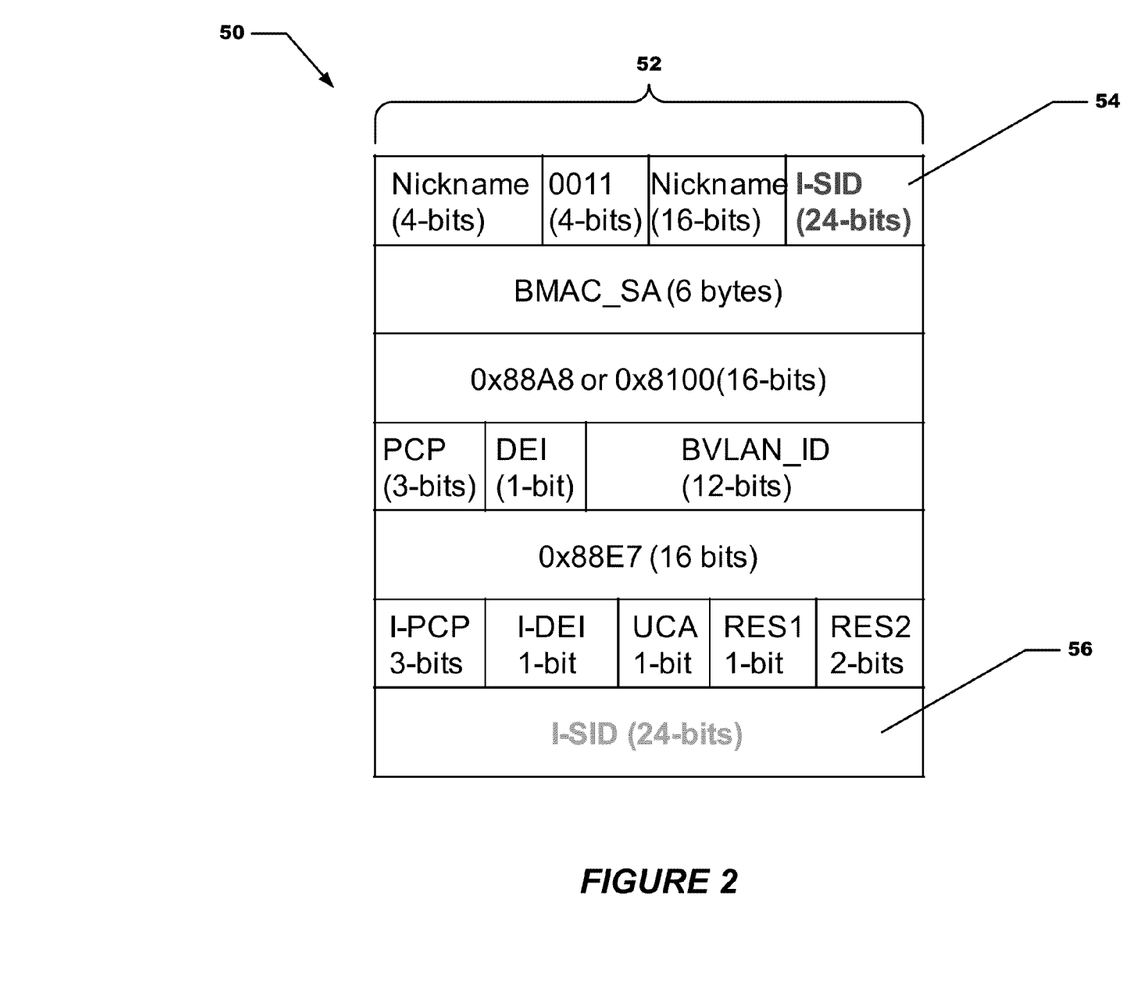
FIG. 2 depicts an SPB multicast MAC-in-MAC header.

Referring now to FIG. 2, a conventional multicast MAC-in-MAC header 50 is shown. A conventional multicast Mac-In-Mac encapsulation header that is added to a given packet by an Ingress Backbone Edge Bridge (BEB) can include two fields (among other fields). One field is the destination Backbone MAC address (BMAC-DA) 52. The BMAC-DA is made up of a 24-bit Organizationally Unique Identifier (OUI), which identifies the Ingress BEB (nickname), and further includes a 24-bit Backbone Service Instance Identifier (I-SID) 54, which is specified in IEEE 802.1 ah. An I-SID 54 can identify a given data stream resource or service attachment information, or otherwise distinguish services within a PBB domain. A second field is a Backbone Service Instance Tag (I-TAG) 56 specified to carry a 24-bit I-SID.

The 24-bit I-SID 54 and the 24-bit I-SID 56 carry the same value in conventional Mac-In-Mac encapsulation, and identify the Layer 2 Virtual Services Network (L2 VSN) to which the packet belongs. Switches in the SPB Network use (BV-LAN, BMAC-DA) lookups to determine how to forward multicast packets.

Multicast traffic inside a SPB network is forwarded based on a pair comprising a Backbone Virtual Local Area Network Identifier, Backbone Media Access Control Destination Address (BVID, BMAC_DA) based lookups where the BVID represents a backbone VLAN and the BMAC_DA represents a backbone MAC address. By way of the presently described method and apparatus for performing multicast BMAC header translations, the following packet transformations are utilized to reduce the number of multicast (BVID, BMAC_DA) records that have to be maintained within the transport network.

Figure 3:
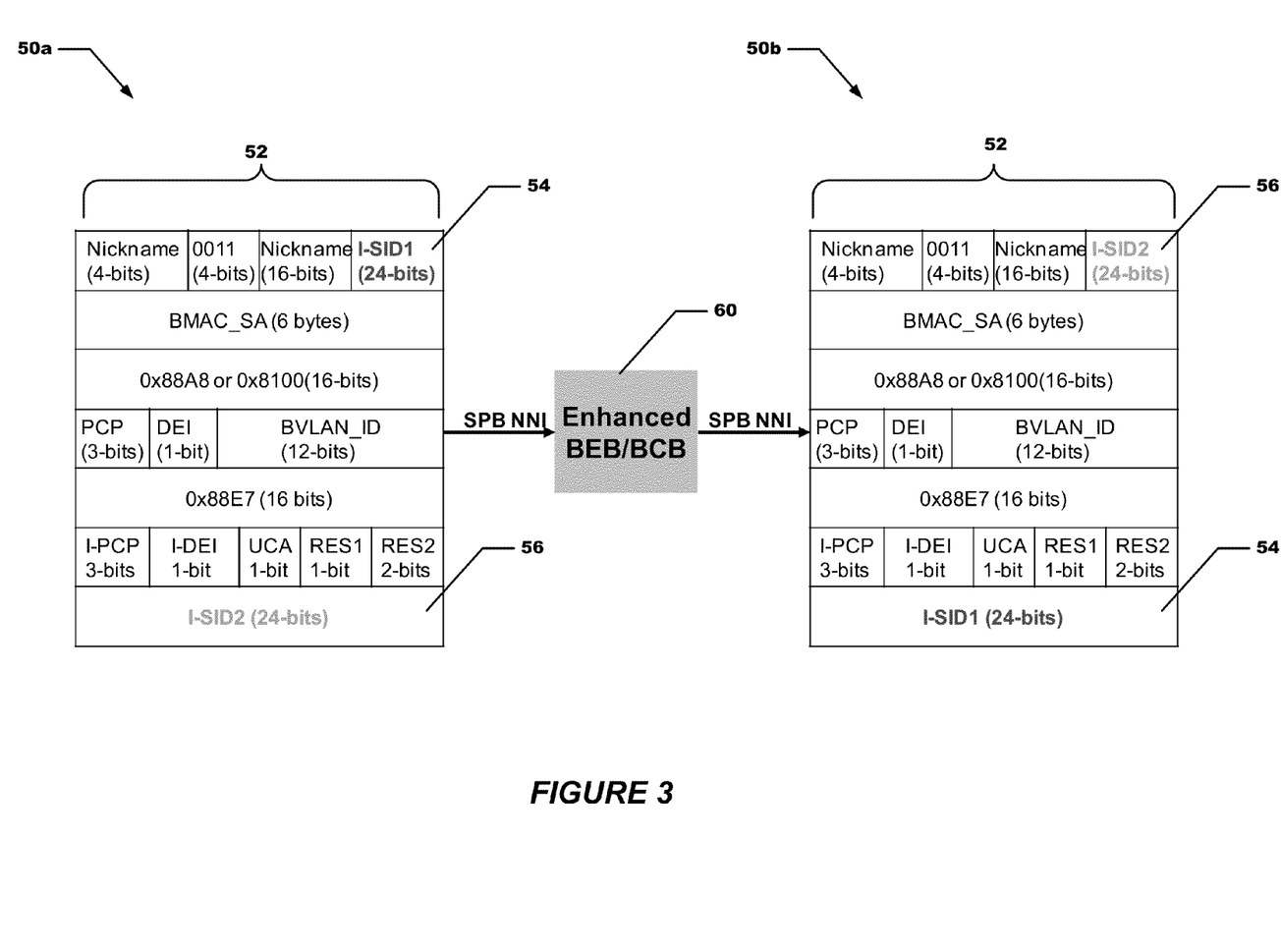
FIG. 3 depicts a header having a Service Instance Identifier (I-SID) swap in accordance with embodiments of the invention.

A first transformation is shown in FIG. 3. An SPB node receives a multicast Mac-In-Mac packet 50a on a SPB-ISIS (Intermediate System to Intermediate System) enabled interface with a BMAC_DA as defined by 802.1aq/802.ah.

Based on the results of the (BVID, BMAC_DA) lookup, this packet is forwarded on one or more SPB-ISIS enabled interfaces. On some of the interfaces, the packet that is forwarded is modified by Backbone Edge Bridge/Backbone Core Bridge (BCB)BEB/BCB 60. This involves replacing the I-SID 54 of BMAC_DA 52 with the I-SID 56 in the I-TAG of the original packet and by replacing the I-SID 56 in the I-TAG with the I-SID 54 in the BMAC_DA 52 of the original packet. This transformed packet is shown as packet 50b.

The conventional way of forwarding a multicast packet inside the SPB Network does not change the I-SID 54 value in the BMAC_DA 52 and I-TAG 56. The presently described multicast packet header translation takes advantage of the fact that the Multicast Encapsulation header as defined the standard (IEEE 802.1ah/802.1aq) includes the I-SID in two separate locations, the first as part of the BMAC_DA 52 and the second as part of the I-TAG 54. The forwarding in the core of the network does not depend on the I-SID 56 value in the I-TAG, so a more granular I-SID 54 value in the BMAC_DA 52 is swapped with a less granular I-SID from the I-TAG 56 and an intermediate transport network only sees the less granular I-SID 56 in the BMAC_DA 52 of the translated packet 50b resulting in less forwarding state in the transport network.

Figure 4:
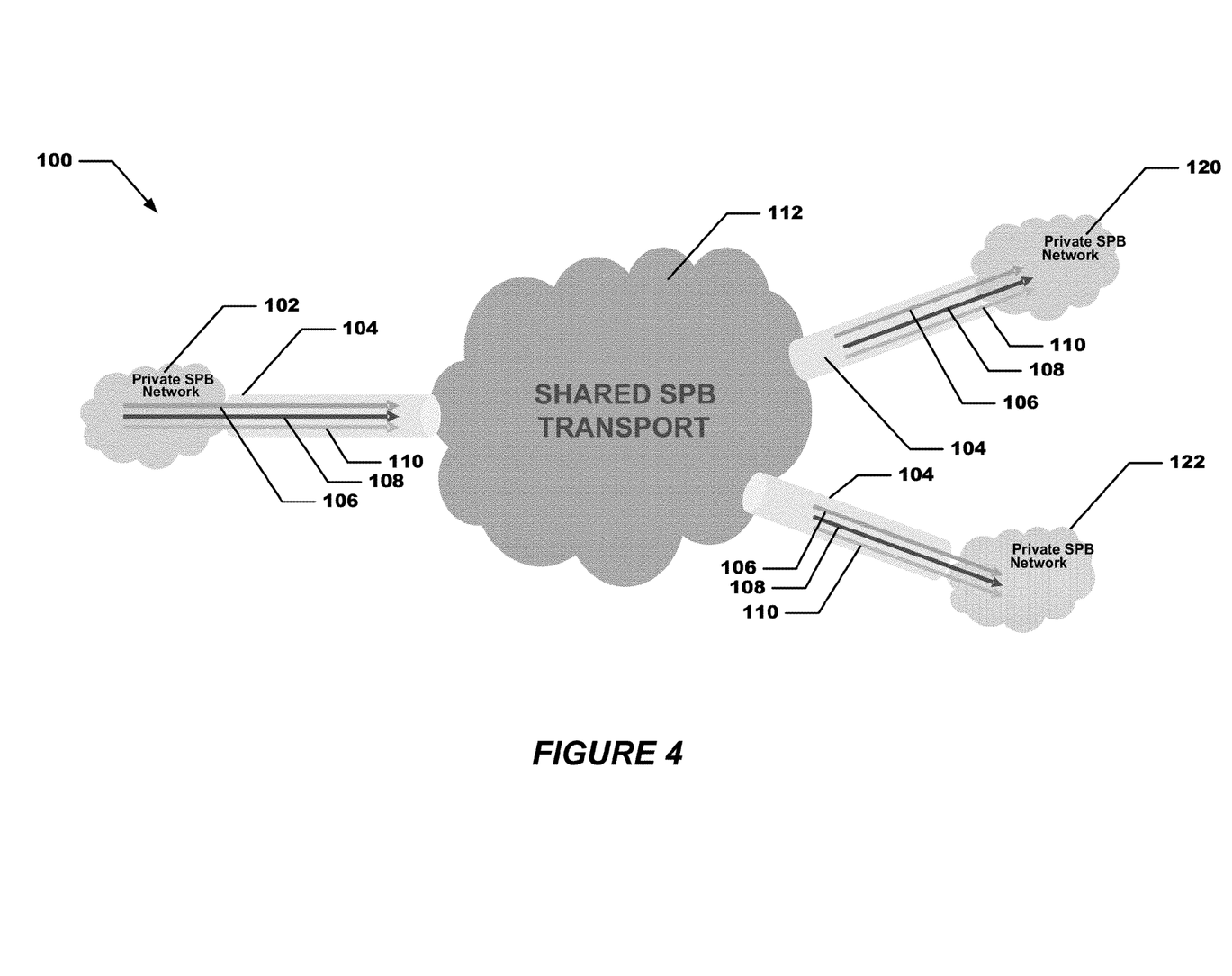
FIG. 4 depicts a network environment including a plurality of private SPB networks using an SPB transport incorporating the I-SID replacement of FIG. 3.

Referring to FIG. 4 an environment 100 wherein the I-SID swap described above has occurred is shown. A private SPB network 102 is shown in communication with a shared SPB transport network 112 and private SPB network 120 as well as private SPB network 122. Private SPB network 102 has three separate packet flows 106, 108 and 110, each having a respective I-SID. A BEB device (not shown) in private SPB network 102 has performed the I-SID translation described with respect to FIG. 3, resulting in all three flows having a common I-SID 104. I-SID 104 represents a FAT multicast tree that is known to the shared SPB network 112. Forwarding in the shared SPB transport network 112 depends only on the BMAC-DA which shows only a single I-SID 104 for all three flows. Flows 106, 108, 110 are known only to the private SPB networks 102, 120 and 122 external to the shared SPB transport network 112. The multicast forwarding table in the shared SPB transport network 112 stays small in size even if the private SPB networks 102, 120 and 122 have a large number of flows. The translation is reversed as the packets leave the shared transport network 112, resulting in the packets being returned to their original state.

Figure 5:
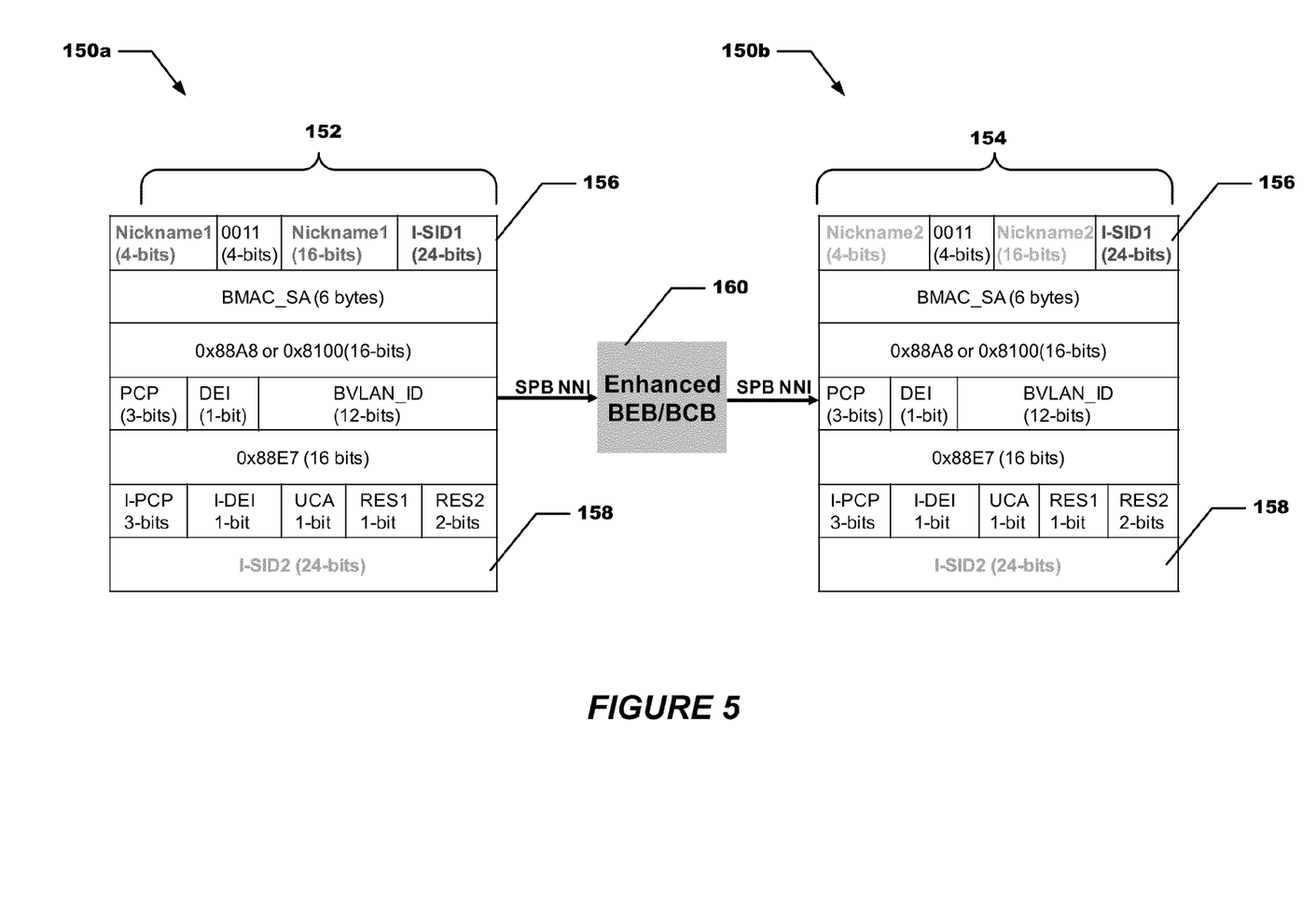
FIG. 5 depicts a header having a nickname replaced in accordance with embodiments of the invention.

Referring now to FIG. 5, a second transformation is shown. An SPB node receives a multicast Mac-In-Mac packet 150a on a SPB-ISIS (Intermediate System to Intermediate System) enabled interface with a BMAC_DA as defined by 802.1aq/802.ah. Based on the results of the (BVID, BMAC_DA) lookup, this packet is forwarded on one or more SPB-ISIS enabled interfaces. On some of the interfaces, the packet that is forwarded is modified by BEB/BCB 160. This involves replacing the nickname of BMAC_DA 152 with a different nickname 154 as shown in packet 150b. The nickname 154 that is used is the nickname of the device that is forwarding the packet. This transformed packet is shown as packet 150b.

The conventional way of forwarding a multicast packet inside the SPB Network does not change the nickname value in the BMAC_DA. Replacing the nickname in the BMAC_DA as a multicast packet leaves one SPB Network (or region) and enters another, allows the number of unique BMAC_DA values seen in the other network to go down, since it allows the boundary nodes to represent the multicast state generated by multiple nodes in the other SPB network.

Figure 6:
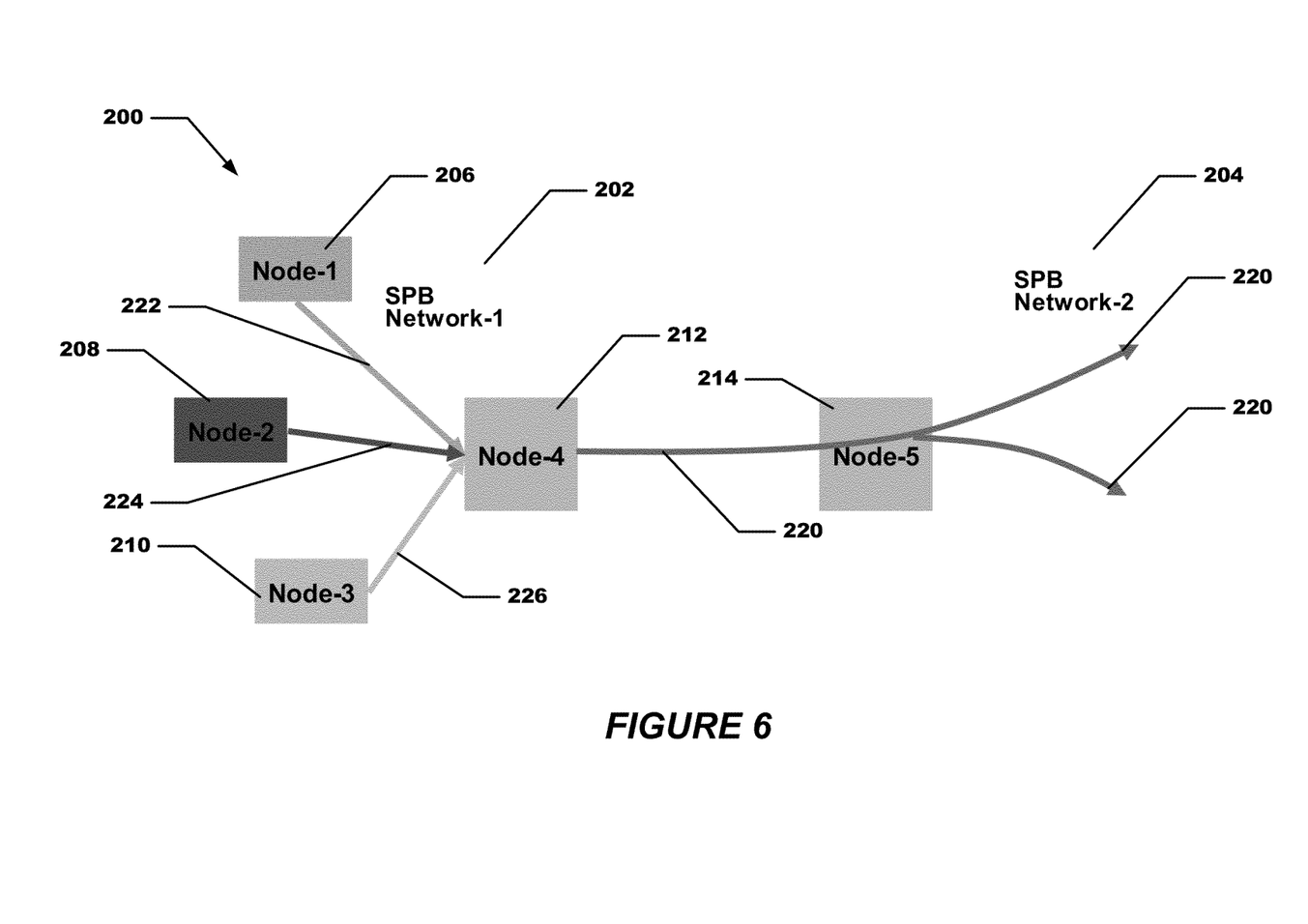
FIG. 6 depicts a network environment including a plurality of private SPB networks using an SPB transport incorporating the nickname replacement of FIG. 5.

Referring to FIG. 6 an environment 200 wherein the nickname swap described above has occurred is shown. A BEB device (not shown) in private SPB network 202 has performed the nickname translation described with respect to FIG. 5, resulting in all nodes 206, 208 and 210 having a common nickname in the BMAC_DA. Forwarding in the shared network depends only on the BMAC-DA which shows only a single nickname for all three flows.

A third transformation involves the following. A SPB Node receives a multicast Mac-In-Mac packet on a SPB-ISIS enabled interface with a BMAC_DA as defined by 802.1aq/802.ah. Based on the result of the (BVID, BMAC_DA) lookup, this packet is forwarded on one or more SPB-ISIS enabled interfaces. On some of the interfaces the packet that is forwarded is modified by replacing I-SID in the BMAC_DA with another value which could either be configured on the node or learned through a control protocol. Also the I-SID in the I-TAG is replaced by the I-SID in the BMAC_DA of the original packet.

The conventional way of forwarding a multicast packet inside the SPB Network does not change the I-SID value in the BMAC_DA and I-TAG. The solution takes advantage of the fact that the Multicast Encapsulation header as defined in the standard (IEEE 802.1ah/802.1aq) includes the I-SID in two separate locations, the first as part of the BMAC_DA and the second as part of the I-TAG. But the forwarding in the core of the network does not depend on the I-SID value in the I-TAG. Accordingly, a more granular I-SID value in the BMAC_DA can be swapped with a less granular I-SID which could either be manually configured on the node or learned through a control protocol.

Figure 7:
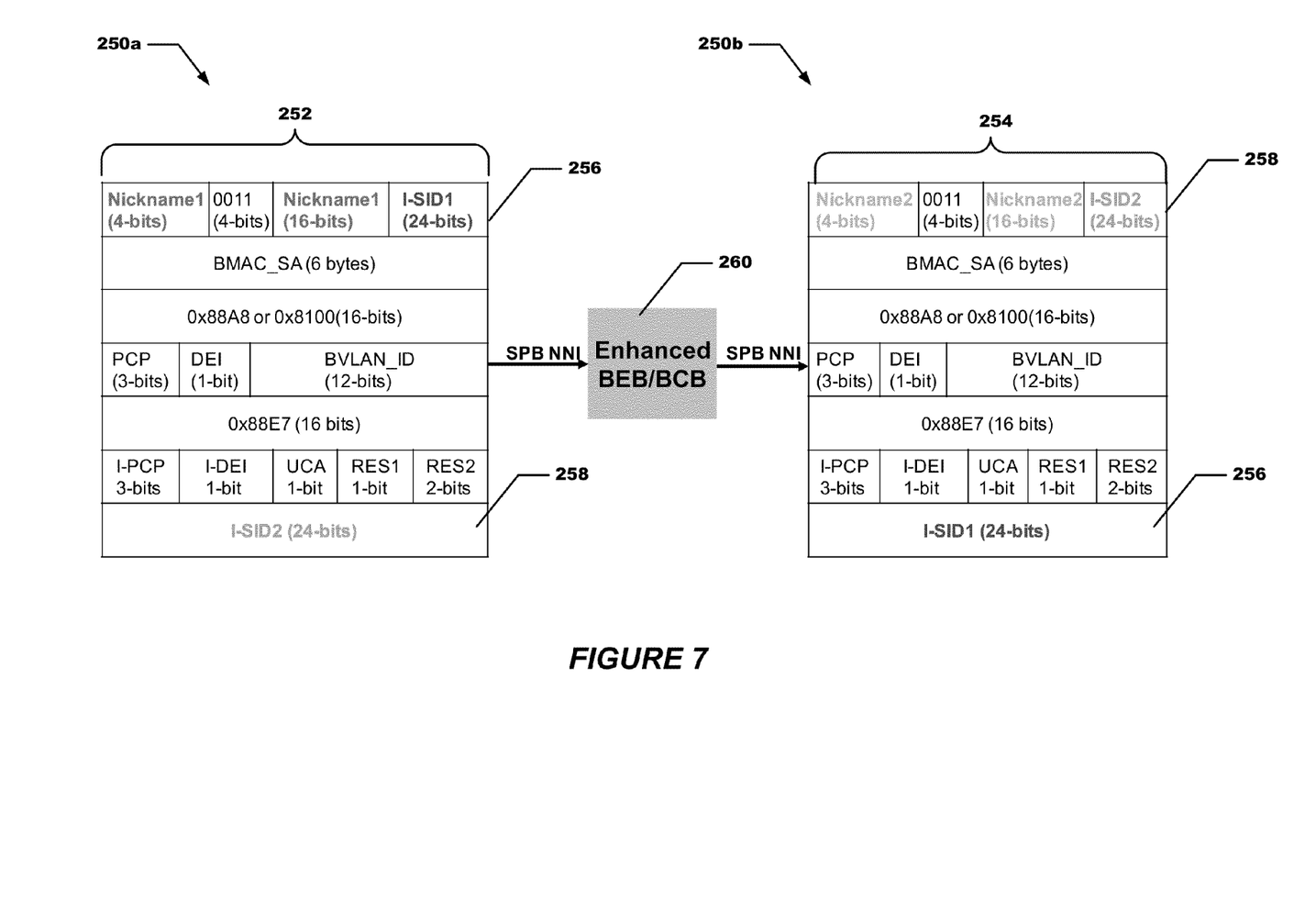
FIG. 7 depicts a header having an I-SID swap and having a nickname replaced in accordance with embodiments of the invention.

Referring now to FIG. 7, a fourth transformation is a combination of the first transformation and the second transformation described above with respect to FIGS. 3 and 5. A boundary node swaps the I-SID values in the I-TAG and BMAC_DA and in addition replaces the nickname in the BMAC_DA with its own nickname.

Figure 8:
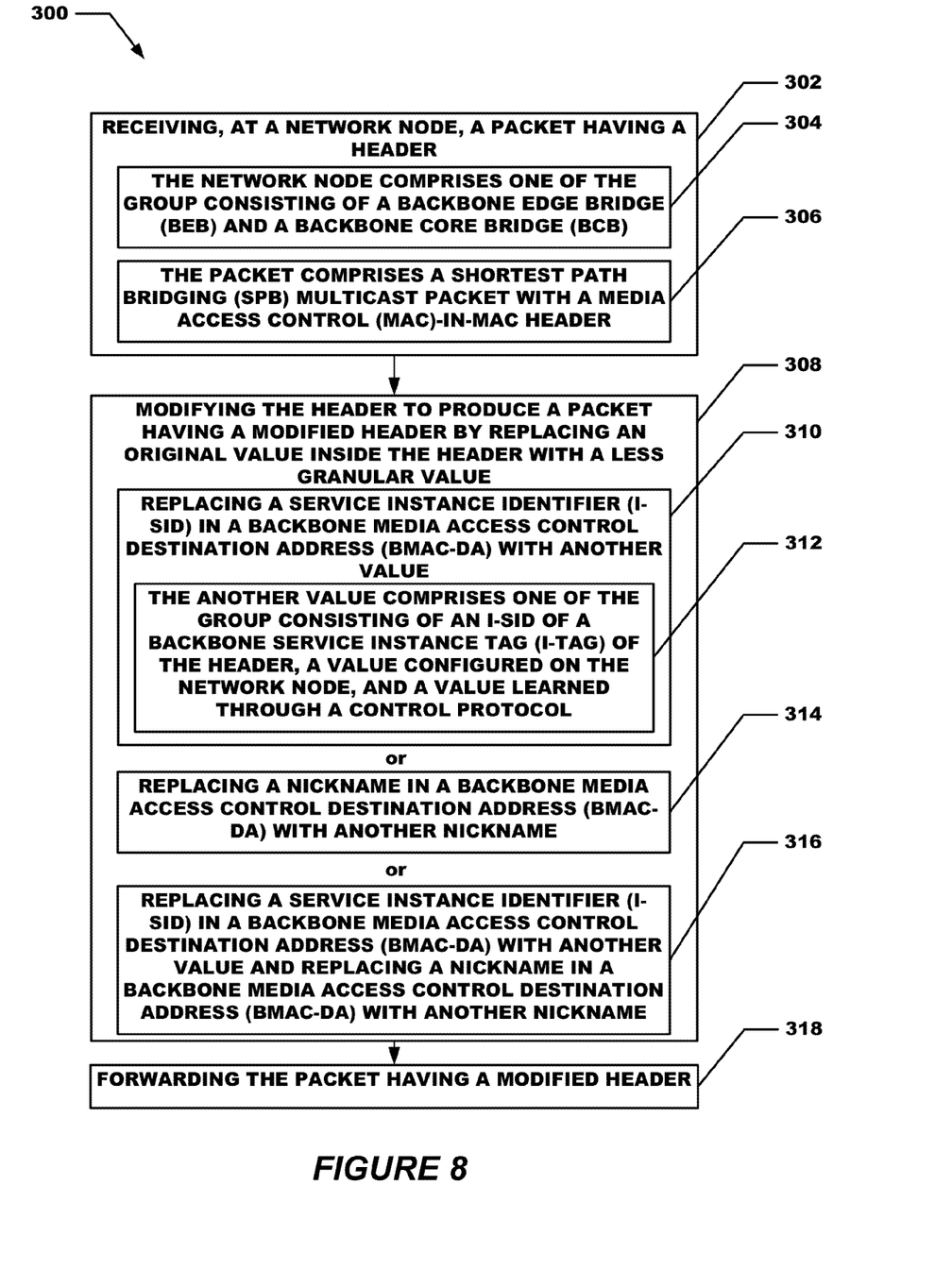
FIG. 8 is a flow diagram showing a particular embodiment of a method for performing multicast BMAC header translations in accordance with embodiments of the invention.

A flow chart of the presently disclosed method is depicted in FIG. 8. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

In a particular embodiment of a method 300 for providing multicast BMAC header translations, the method 300 begins with processing block 302 which recites receiving, at a network node, a packet having a header. As shown in processing block 304 the network node comprises one of the group consisting of a Backbone Edge Bridge (BEB) and a Backbone Core Bridge (BCB). As further shown in processing block 306 the packet comprises a Shortest Path Bridging (SPB) multicast packet with a Media Access Control (MAC)-in-MAC header.

Processing block 308 discloses modifying the header to produce a packet having a modified header by replacing an original value inside the header with a less granular value. As further recited in processing block 310 modifying the header involves replacing a Service Instance Identifier (I-SID) in a Backbone Media Access Control Destination Address (BMAC-DA) with another value. As further recited in processing block 312, the another value comprises one of the group consisting of an I-SID of a Backbone Service Instance Tag (I-TAG) of the header, a value configured on the network node, and a value learned through a control protocol. As shown in processing block 314 in another embodiment modifying the header comprises replacing a nickname in a Backbone Media Access Control Destination Address (BMAC-DA) with another nickname. In yet another embodiment, as disclosed in processing block 316, modifying the header to produce a packet having a modified header comprises replacing a Service Instance Identifier (I-SID) in a Backbone Media Access Control Destination Address (BMAC-DA) with another value and replacing a nickname in a Backbone Media Access Control Destination Address (BMAC-DA) with another nickname.

Processing block 318 states forwarding the packet having a modified header. The packet is forwarded into a transport network. Upon the packet exiting the transport network the translations may be reversed, so the exiting packet contains the original packet information.

Figure 9:
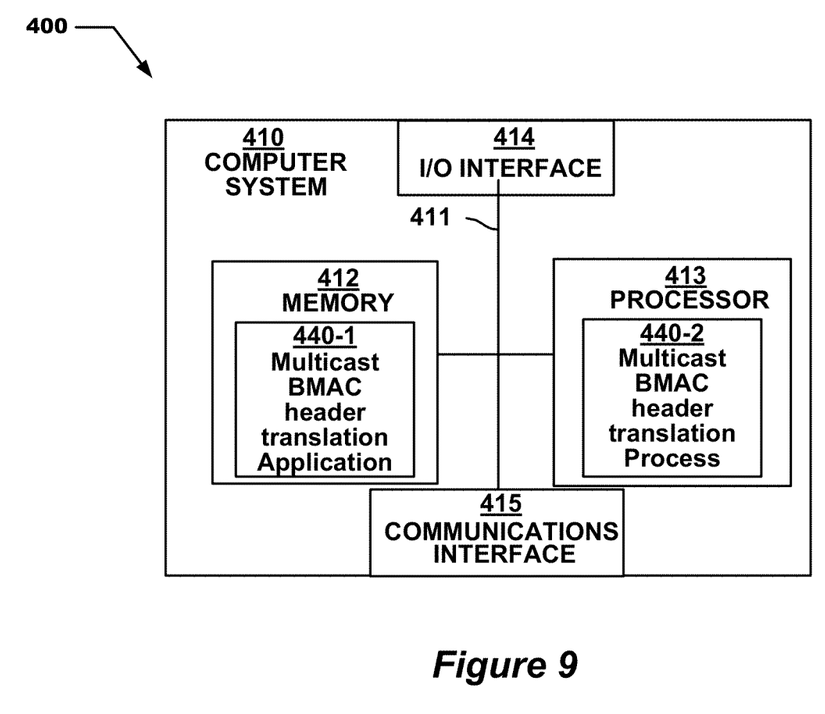
FIG. 9 illustrates an example computer system architecture for a network node that performs multicast BMAC header translations in accordance with embodiments of the invention.

FIG. 9 is a block diagram illustrating an example architecture of a computer system 110 that executes, runs, interprets, operates or otherwise performs a multicast BMAC header translation application 140-1 and multicast BMAC header translation process 140-2 suitable for use in explaining example configurations disclosed herein. The computer system 110 may be any type of computerized device such as a personal computer, workstation, portable computing device, console, laptop, network terminal or the like. An input device 116 (e.g., one or more customer/developer controlled devices such as a keyboard, mouse, etc.) couples to processor 113 through I/O interface 114, and enables a customer 108 to provide input commands, and generally control the graphical customer interface 160 that the multicast BMAC header translation application 140-1 and process 140-2 provides on the display 130. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with a multicast BMAC header translation application 140-1 as explained herein. The multicast BMAC header translation application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of a multicast BMAC header translation application 140-1. Execution of a multicast BMAC header translation application 140-1 in this manner produces processing functionality in the multicast BMAC header translation process 140-2. In other words, the multicast BMAC header translation process 140-2 represents one or more portions or runtime instances of a multicast BMAC header translation application 140-1 (or the entire a multicast BMAC header translation application 140-1) performing or executing within or upon the processor 113 in the computerized device 110 at runtime.

It is noted that example configurations disclosed herein include the multicast BMAC header translation application 140-1 itself (i.e., in the form of un-executed or non-performing logic instructions and/or data). The multicast BMAC header translation application 140-1 may be stored on a computer readable medium (such as a floppy disk), hard disk, electronic, magnetic, optical, or other computer readable medium. A multicast BMAC header translation application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of a multicast BMAC header translation application 140-1 in the processor 113 as the multicast BMAC header translation process 140-2. Those skilled in the art will understand that the computer system 110 may include other processes and/or software and hardware components, such as an operating system not shown in this example.

During operation, processor 113 of computer system 100 accesses memory system 112 via the interconnect 111 in order to launch, run, execute, interpret or otherwise perform the logic instructions of the multicast BMAC header translation application 140-1. Execution of multicast BMAC header translation application 140-1 produces processing functionality in multicast BMAC header translation process 140-2. In other words, the multicast BMAC header translation process 140-2 represents one or more portions of the multicast BMAC header translation application 140-1 (or the entire application) performing within or upon the processor 113 in the computer system 100.

It should be noted that, in addition to the multicast BMAC header translation process 140-2, embodiments herein include the multicast BMAC header translation application 140-1 itself (i.e., the un-executed or non-performing logic instructions and/or data). The multicast BMAC header translation application 140-1 can be stored on a computer readable medium such as a floppy disk, hard disk, or optical medium. The multicast BMAC header translation application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of multicast BMAC header translation application 140-1 in processor 113 as the multicast BMAC header translation process 140-2. Those skilled in the art will understand that the computer system 100 can include other processes and/or software and hardware components, such as an operating system that controls allocation and use of hardware resources associated with the computer system 100.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method comprising:
  receiving, at a network node, a packet having a header;
  modifying said header to produce a packet having a modified header by replacing an original value inside said header with a less granular value, wherein said modifying said header to produce a packet having a modified header comprises replacing a nickname in a Backbone Media Access Control Destination Address (BMAC-DA) with another nickname; and
  forwarding said packet having a modified header.

2. The method of claim 1 wherein said packet comprises a Shortest Path Bridging (SPB) multicast packet with a Media Access Control (MAC)-in-MAC header.

3. The method of claim 1 wherein said modifying said header to produce a packet having a modified header comprises replacing a Service Instance Identifier (I-SID) in a Backbone Media Access Control Destination Address (BMAC-DA) with another value.

4. The method of claim 3 wherein said another value comprises one of the group consisting of an I-SID of a Backbone Service Instance Tag (I-TAG) of said header, a value configured on said network node, and a value learned through a control protocol.

5. The method of claim 1 wherein said modifying said header to produce a packet having a modified header comprises replacing a Service Instance Identifier (I-SID) in a Backbone Media Access Control Destination Address (BMAC-DA) with another value and replacing a nickname in a Backbone Media Access Control Destination Address (BMAC-DA) with another nickname.

6. The method of claim 1 wherein said network node comprises one of the group consisting of a Backbone Edge Bridge (BEB) and a Backbone Core Bridge (BCB).

7. A non-transitory computer readable storage medium having computer readable code thereon for providing multicast BMAC header translations, the medium including instructions in which a network node performs operations comprising:
  receiving, at a network node, a packet having a header;
  modifying said header to produce a packet having a modified header by replacing an original value inside said header with a less granular value, wherein said modifying said header to produce a packet having a modified header comprises replacing a nickname in a Backbone Media Access Control Destination Address (BMAC-DA) with another nickname; and
  forwarding said packet having a modified header.

8. The computer readable storage medium of claim 7 wherein said packet comprises a Shortest Path Bridging (SPB) multicast packet with a Media Access Control (MAC)-in-MAC header.

9. The computer readable storage medium of claim 8 wherein said instructions for modifying said header to produce a packet having a modified header comprises instructions for replacing a Service Instance Identifier (I-SID) in a Backbone Media Access Control Destination Address (BMAC-DA) with another value and replacing a nickname in a Backbone Media Access Control Destination Address (BMAC-DA) with another nickname.

10. The computer readable storage medium of claim 7 wherein said instructions for modifying said header to produce a packet having a modified header comprises instructions for replacing a Service Instance Identifier (I-SID) in a Backbone Media Access Control Destination Address (BMAC-DA) with another value.

11. The computer readable storage medium of claim 10 wherein said another value comprises one of the group consisting of an I-SID of a Backbone Service Instance Tag (I-TAG) of said header, a value configured on said network node, and a value learned through a control protocol.

12. A network node comprising:
  a memory;
  a processor;
  a communications interface;
  an interconnection mechanism coupling the memory, the processor and the communications interface; and
  wherein the memory is encoded with an application providing multicast BMAC header translations, that when performed on the processor, provides a process for processing information, the process causing the network node to perform the operations of:
  receiving, at said network node, a packet having a header;

modifying said header to produce a packet having a modified header by replacing an original value inside said header with a less granular value, wherein said modifying said header to produce a packet having a modified header comprises replacing a nickname in a Backbone Media Access Control Destination Address (BMAC-DA) with another nickname; and forwarding said packet having a modified header.

13. The network node of claim 12 wherein said packet comprises a Shortest Path Bridging (SPB) multicast packet with a Media Access Control (MAC)-in-MAC header.

14. The network node of claim 12 wherein said modifying said header to produce a packet having a modified header comprises replacing a Service Instance Identifier (I-SID) in a Backbone Media Access Control Destination Address (BMAC-DA) with another value.

15. The network node of claim 14 wherein said another value comprises one of the group consisting of an I-SID of a Backbone Service Instance Tag (I-TAG) of said header, a value configured on said network node, and a value learned through a control protocol.

16. The network node of claim 12 wherein said modifying said header to produce a packet having a modified header comprises replacing a Service Instance Identifier (I-SID) in a Backbone Media Access Control Destination Address (BMAC-DA) with another value and replacing a nickname in a Backbone Media Access Control Destination Address (BMAC-DA) with another nickname.

17. The network node of claim 12 wherein said network node comprises one of the group consisting of a Backbone Edge Bridge (BEB) and a Backbone Core Bridge (BCB).

* * * * *